UNITED STATES PATENT OFFICE.

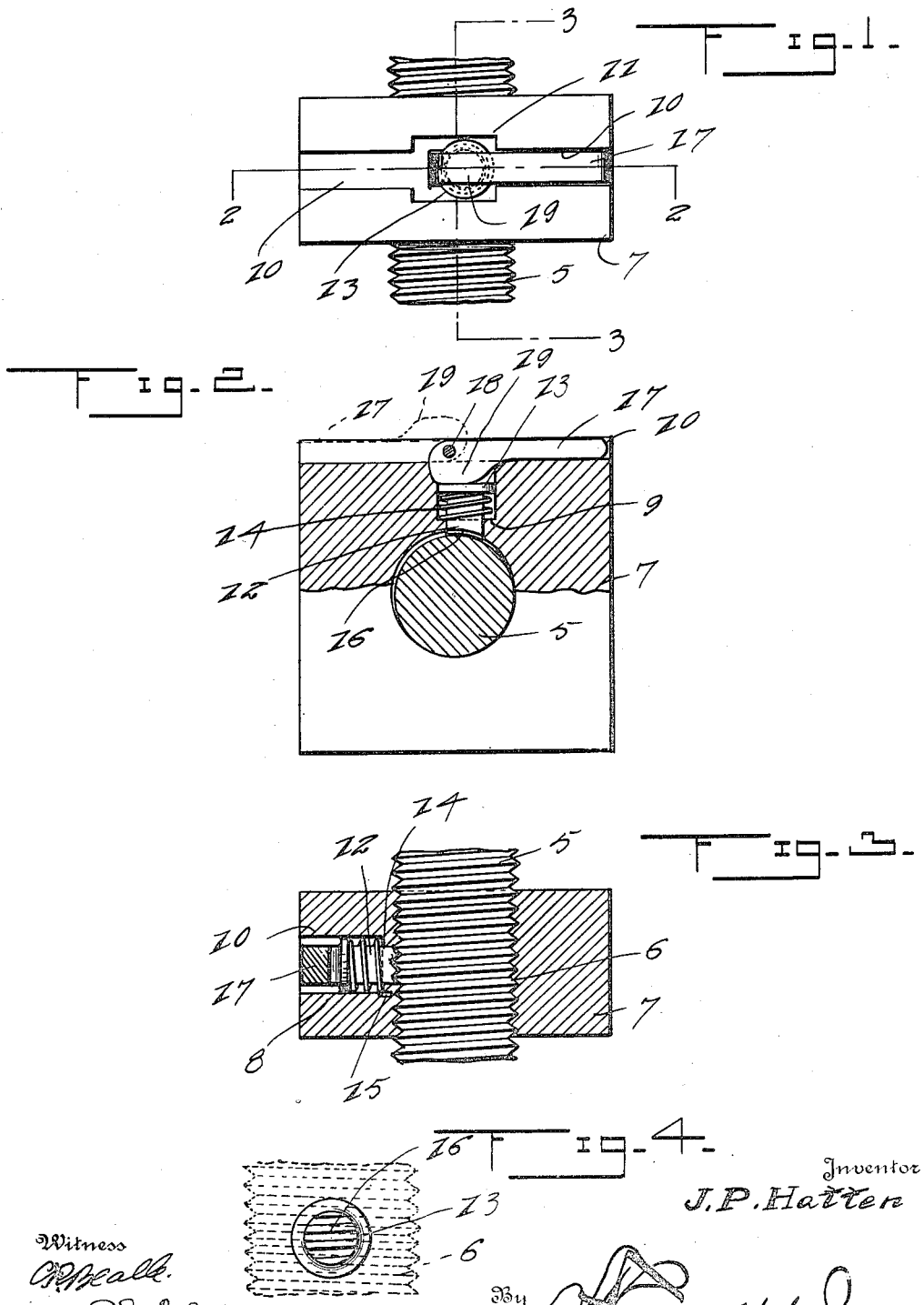

JOHN P. HATTEN, OF BUFFALO, NEW YORK.

NUT-LOCK.

1,289,167.  Specification of Letters Patent.  Patented Dec. 31, 1918.

Application filed November 28, 1916. Serial No. 133,870.

*To all whom it may concern:*

Be it known that I, JOHN P. HATTEN, a citizen of the United States, residing at Buffalo, in the county of Erie and State of New York, have invented certain new and useful Improvements in Nut-Locks; and I do hereby declare the following to be a full, clear, and exact description of the invention, such as will enable others skilled in the art to which it appertains to make and use the same.

This invention has for its object to provide an improved nut lock including a spring retracted locking element slidably received within the nut, and having screw threads at its bolt-engaging end which are pitched oppositely to the screw threads of the bolt so as to effectively lock the nut against rotary movement upon the bolt when the locking element is brought to operative position.

Another object is the provision of means for forcibly setting the locking element against the bolt and retaining it in such position.

With these and other objects in view, the invention consists in the novel construction, combination and arrangement of parts as will be hereinafter specifically described, claimed and illustrated in the accompanying drawing, in which:

Figure 1 represents a fragmentary plan view of the improved nut lock.

Fig. 2 represents a sectional view through the bolt, the nut being partly in section.

Fig. 3 represents a transverse sectional view on the line 3—3 of Fig. 1, and

Fig. 4 represents an end elevation of the locking element removed, the screw threads of the bolt being shown in dotted lines to indicate the difference in the pitch of the threads of the locking element and bolt.

Referring to the drawing in detail, wherein similar reference numerals designate corresponding parts throughout the several views, the numeral 5 indicates a preferred type of bolt having the usual external screw threads received within the internally screw threaded bore 6 of a nut 7.

The nut 7 is formed with a substantially radial opening, 8, which is reduced in diameter at a point adjacent the bore 6 to provide an outwardly facing annular shoulder 9, and one side face of the nut is formed with an elongated slot 10, which intersects the opening 9 and is increased in width at the point of intersection, as indicated at 11.

The locking element 12, which is preferably cylindrical in cross section, is slidably fitted in the opening 8 and the inner terminal thereof is concave so as to snugly fit the general convex surface of the bolt 5. The outer terminal of the locking element is formed with a head or flange 13, which is received within the relatively large portion of the opening 8 and forms a stop for one terminal of a spring 14, the opposite end of which is directed angularly, as indicated at 15, and seated in a recess formed in the shoulder 9, whereby the locking element is normally retained in outwardly extended position with relation to the bore of the nut.

The inner terminal of the locking element 12 is formed with parallel ribs or screw threads 16, which are pitched oppositely to the screw threads of the bolt 5, so as to increase the locking efficiency of the locking element when it is brought into firm engagement with the screw threads of the bolt.

A cam lever 17 is pivotally secured by a pin 18 extending transversely through the groove 10 and is adapted, when moved inwardly to operative position, as indicated in full lines in Fig. 2, to lie entirely within the groove, so as not to interfere with the application of the jaws of a wrench to the nut. The pivoted end of the cam lever is formed with a cam 19, the prominent portion of which is so disposed with relation to the pivotal axis 18 of the lever as to retain the latter in the full line position in Fig. 2, so as to lock the element 12 in inwardly extended position.

In use, the cam lever 17 is swung to the dotted position shown in Fig. 2, and the spring 14 automatically retracts the locking element from the bore of the nut, and the latter may be then conveniently applied to the bolt and advanced to the desired position thereon. Subsequent to the desired adjustment of the nut the cam lever 17 is swung from the dotted line position in Fig. 2 to the full line position, the cam 19 working against the headed terminal 13 of the locking element forcing the latter inwardly against the tension of the spring 14 and engaging the threaded end 16 with the screw threads of the bolt 5, effectively locking the nut against rotation thereon. The locking efficiency of the element 12 is materially increased by the disposition of the threads or ribs 16 with relation to the threads of the bolt 5, which, as previously stated, are oppositely pitched.

What I claim is:

A nut lock including a bolt, a nut fitted upon the bolt and having a radial opening therein, said opening being reduced at a point adjacent the bolt, said reduced portion forming a shoulder, a locking element slidably mounted in the opening, said locking element having an enlarged head, means interposed between the shoulder in the radial opening of the nut and the enlarged head of the locking element to eject the locking element from the opening.

In testimony whereof I affix my signature in presence of two witnesses.

JOHN P. HATTEN.

Witnesses:
ALBERT J. FITZGIBBONS,
ANNABELLE H. FITZGIBBONS.